United States Patent [19]

Candido

[11] Patent Number: 5,486,883
[45] Date of Patent: Jan. 23, 1996

[54] TRANSPARENCY PROTECTOR

[75] Inventor: Thomas A. Candido, Hauppauge, N.Y.

[73] Assignee: Enbee Plastics, Inc., Long Island City, N.Y.

[21] Appl. No.: 25,619

[22] Filed: Mar. 3, 1993

[51] Int. Cl.⁶ .................................................. G03B 21/64
[52] U.S. Cl. ............................... 353/120; 353/DIG. 3; 40/159
[58] Field of Search ........................... 353/120, DIG. 3, 353/DIG. 5; 40/159.2, 159, 158.1, 156; 428/137

[56] References Cited

U.S. PATENT DOCUMENTS

| | | | |
|---|---|---|---|
| 3,869,201 | 3/1975 | Lysle | 353/120 |
| 4,402,585 | 9/1983 | Gardlund | 353/120 |
| 4,810,544 | 3/1989 | Hickman | 428/137 |
| 4,814,216 | 3/1989 | Brunett et al. | |
| 4,925,720 | 5/1990 | Hansen | 428/137 |

Primary Examiner—William C. Dowling
Attorney, Agent, or Firm—Michael Ebert

[57] ABSTRACT

A protector adapted to accommodate a transparency to maintain it in a clean, dust-free and dry condition so that it may be used with an overhead optical projector to cast the image carried by the transparency onto a viewing screen. The protector is constituted by an open-ended rectangular sleeve whose dimensions are appropriate to those of the transparency, the sleeve including a front panel formed of transparent, acetate film that is breathable to permit a transparency inserted in the sleeve in a wet state to dry out. Also included is a rear panel formed of a transparent, synthetic plastic film of high strength having the same length as the front panel and joined thereto at one side edge to form a folder to receive the transparency so that it is then sandwiched between the panels. The width of the rear panel is greater than that of the front panel to form a flap that is folded over to define at the other side edge of the sleeve a margin that can be provided with a set of punch holes whereby the transparency-loaded protector can be kept when not in use in a ring binder or file.

4 Claims, 1 Drawing Sheet

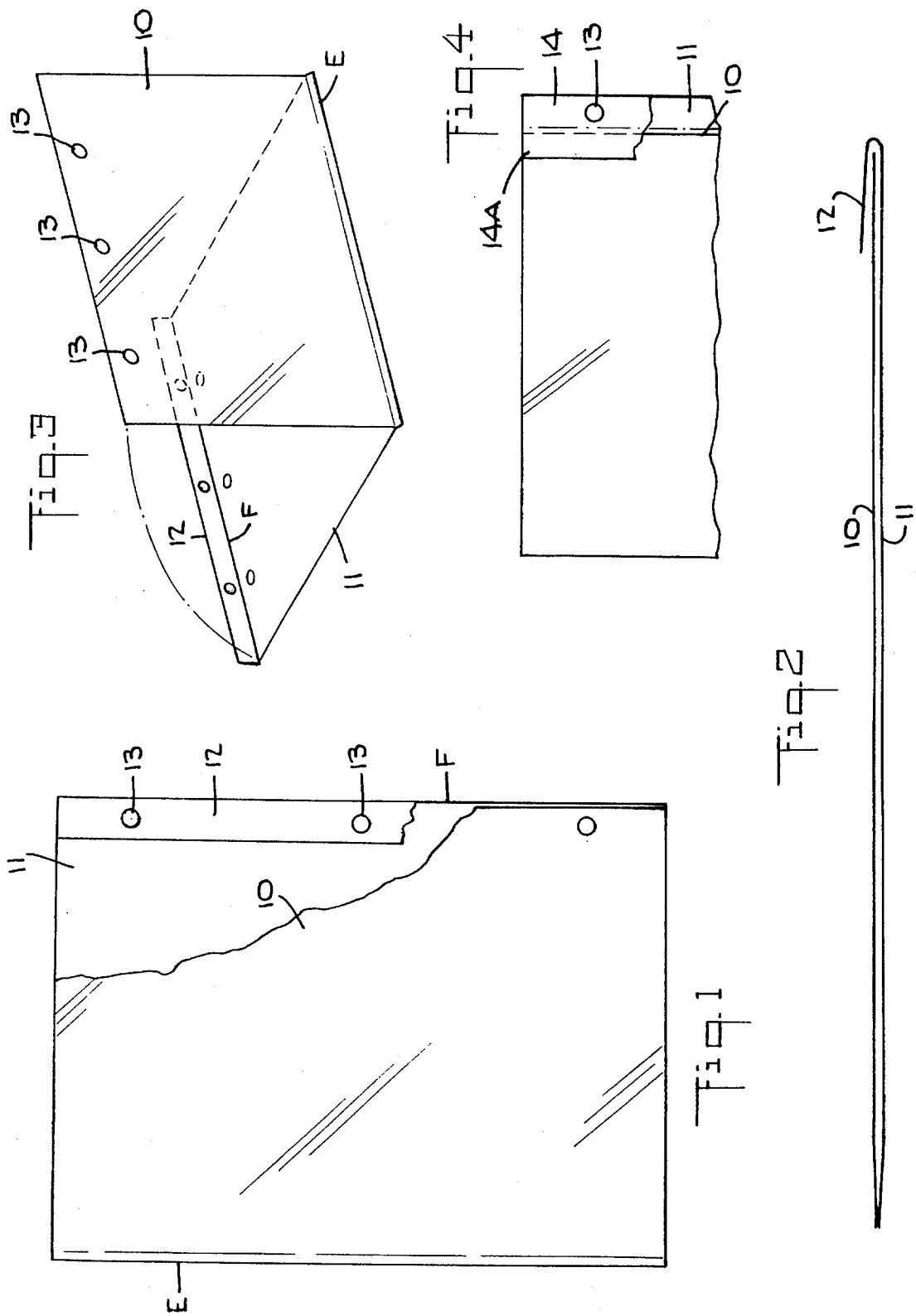

TRANSPARENCY PROTECTOR

BACKGROUND OF INVENTION

1. Field of Invention

This invention relates generally to protectors for storing overhead transparencies, and more particularly to a protector of this type having a composite structure, the front panel being formed of transparent, moisture-permeable, acetate film whereby when the transparency inserted in the protector is in a moist state, it will dry out in the course of storage.

2. Status of Prior Art

When lecturing before a class, making a business presentation in a board room or some other setting imparting information to an audience, it is common practice to make use of visual aids in the form of transparencies. These transparencies carry images of charts, graphs, drawings, pictures and other forms of data. The image appearing on a transparency is magnified and cast on a large screen viewable by the audience by means of an overhead optical projector.

A typical transparency for use with an overhead projector is a rectangular film 8½×11 inches in size, the film being about 3 mils thick. In order to maintain the transparency in a clean, dust-free condition, it is conventional to jacket the transparency within a transparent envelope or protector made of polyethylene, polypropylene or other synthetic, plastic film material of high clarity and strength.

The transparency is sandwiched between the clear front and rear panels of the protector. The length of the protector is about the same as that of the transparency, but its width is about a half inch greater to define a side margin in which a set of holes is punched so that the protector can be stored in a ring binder or file.

Thus, when a lecture is to be given in a lecture hall, the lecturer brings to the hall a ring binder containing the transparency protectors that are to be used as visual aids in the course of the lecture. Then after being removed from the ring binder, each transparency protector, at the appropriate time, is placed in the rectangular, horizontal stage of the overhead projector so that the projected image of the transparency can be cast onto the screen and viewed by the audience.

The envelope or protector disclosed in the Gardlund Pat. No. 4,402,585 is constituted by a rectangular sleeve of transparent polypropylene film which is open along one longitudinal side edge to permit the insertion of a transparency between the front and rear panel of the sleeve. Holes punched in the longitudinal side edge make it possible to store the protector in a loose leaf binder or a file.

Transparencies carrying images are developed and printed in a photographic processing machine and usually emerge from the machine in a moist state, the transparency then being inserted in a protector to maintain it in a clean, dust-free condition. When the protector is made of Mylar polyester or other high strength synthetic plastic film material which is impermeable to moisture, the moist transparency is unable to dry out unless kept in storage for a prolonged period. As a consequence, if the transparency is still moist when the transparency-loaded protector is put to use in an overhead projector, the residual moisture will impair the clarity of the projected image.

To overcome this drawback, it is known to provide a protector formed entirely of breathable acetate film formed of cellulose acetate resin. One such protector is disclosed in the Hickman U.S. Pat. No. 4,810,544. This protector is formed of a blank of diacetate film that is folded to form the front and rear panels of the protector. The rear panel is of greater width to form a flap that is folded over to form a margin at a side edge of the folder which is provided with a set of punch holes so that the protector can be stored in a ring binder or file.

However, acetate film is relatively weak. Hence, in order to avoid tearing of the protector at the punch holes, adhered to the flap is a strip of double-face, pressure-sensitive tape to reinforce the margins of the protector. A protector of this type is more expensive to make than one made of synthetic plastic film material such as polypropylene, for acetate or diacetate which is formed by two groups of acetate is costly. Moreover, the need to add an adhesive tape strip to the diacetate protector adds substantially to the cost of manufacturing this protector.

SUMMARY OF INVENTION

In view of the foregoing, the main object of this invention is to provide a protector adapted to accommodate a transparency to maintain it in a clean, dust-free and dry condition so that it may be used with an overhead optical projector to cast the image carried by the transparency onto a viewing screen.

More particularly, it is an object of this invention to provide a protector which is a composite of a front panel formed of breathable acetate film material and a rear panel formed of transparent, synthetic, plastic film material of relatively high strength, whereby when the protector is loaded with a transparency in a moist state, the transparency will quickly dry out.

Also an object of the invention is to provide a protector that can be manufactured at a lower cost than one made entirely of synthetic plastic film material.

Briefly stated, these objects are attained in a protector adapted to accommodate a transparency to maintain it in a clean, dust-free and dry condition so that nit may be used with an overhead optical projector to cast the image carried by the transparency onto a viewing screen. The protector is constituted by an open-ended rectangular sleeve whose dimensions are appropriate to those of the transparency, the sleeve including a front panel formed of transparent-acetate film that is breathable to permit a transparency inserted in the sleeve in a wet state to dry out. Also included is a rear panel formed of a transparent, synthetic plastic film of high strength having the same length a the front panel and joined thereto at one side edge to form a folder to receive the transparency so that it is then sandwiched between the panels. The width of the rear panel is greater than that of the front panel to form a flap that is folded over to define at the other side edge of the sleeve a margin that can be provided with a set of punch holes whereby the transparency-loaded protector can be kept when not in use in a ring binder or file.

BRIEF DESCRIPTION OF DRAWINGS

For a better understanding of the invention as well as other objects and further features thereof, reference is made to the following detailed description to be read in conjunction with the accompanying drawings, wherein:

FIG. 1 is a plan view of one embodiment of a protector in accordance with the invention;

FIG. 2 is an end view of the protector;

FIG. 3 is a perspective view of the protector, showing the front panel unfolded from the rear panel; and FIG. 4 illustrates a second embodiment of a protector in accordance with the invention.

DESCRIPTION OF INVENTION

Referring now to FIGS. 1 to 3, a protector in accordance with the invention, in the embodiment shown in these figures, is constituted by an open-ended rectangular sleeve whose dimensions are such as to snugly accommodate a typical 8½×11 inch transparency.

The protector includes a front panel 10 formed of acetate film material. By acetate film is meant a durable, highly transparent film with non-deforming characteristics, produced from cellulose acetate resin. Included in this definition is diacetate film. The protector also includes a rear panel which is preferably formed of transparent polypropylene film, a thermoplastic polymer of high strength, far greater than that of cellulose acetate, but of substantially lower cost. In practice, other synthetic plastic film, such as Mylar polyester and polyethylene, may be used in lieu of polypropylene.

Front panel 10, which is superposed on rear panel 11 and has the same length, is adhesively bonded or otherwise joined to the rear panel at its left side long edge E, thereby creating a folder into which one inserts the transparency to be stored so that the transparency is then sandwiched between the front and rear panels.

The width of rear panel 11 is greater than that of the front panel (about ½ inch) to form a flap 12 that is folded on fold line F over the front panel at the long right edge of the protector to define a narrow margin on which is punched a set of three equi-spaced holes 13 which, as best seen in FIG. 3, go through flap 12, front panel 10 and rear panel 11. As a consequence, these holes are highly resistant to tearing; for while the acetate film front panel 10 is relatively weak, it is sandwiched at the margin of the protector by the high strength polypropylene flap 12 and rear panel 11.

The acetate film which forms front panel 10 is "breathable;" that is to say, it is permeable to moisture. Hence, when a transparency is inserted between the front and rear panels of the protector and the face of the transparency which carries an image is in a moist state, having just emerged from the machine producing the transparency, the moisture is free to evaporate and pass through the acetate front panel overlying the face of the transparency.

It is desirable to insert the transparency in the protector while it is still in a moist state, for otherwise if the transparency is exposed in its wet state, it may become contaminated by atmospheric dust and other particles. But while initially the transparency is moist, it dries out in the protector, so that when the loaded protector is put to use in an overhead optical projector, it is in a dry state and there is no residual moisture to impair the clarify of the projected image.

The embodiment of the protector shown in FIG. 4 is the same as that shown in FIG. 1, except that the flap extension 14 is about twice as wide as flap 12 in FIG. 1 and when folded over, half of the wider flap is adhesively or otherwise bonded to the right margin of the rear panel 11, the remaining half 14A being free, so that the margin of front panel 10 may be inserted thereunder to close the folder.

In practice, the front and rear panels of the protector have a thickness of 3 mils or less.

While there has been shown and described a preferred embodiment of a transparency protector in accordance with the invention, it will be appreciated that many changes and modifications may be made therein without, however, departing from the essential spirit thereof.

I claim:

1. A composite protector adapted to accommodate a transparency to maintain it in a clean, dust-free and dry condition so that it may be used with an overhead optical projector to cast the image carried by the transparency onto a viewing screen, the protector comprising an open-ended rectangular sleeve whose dimensions are appropriate to those of the transparency, the sleeve including a front panel formed of transparent, acetate film of relatively low strength that is breathable to permit a transparency inserted in the sleeve in a wet state to dry out, a rear panel formed of a transparent, synthetic-plastic film of high strength having the same length as the front panel and joined thereto at one side edge to form a folder to receive the transparency so that it is then sandwiched between the panels, the width of the rear panel being greater than that of the front panel to form a high strength flap that is folded over to define at the other edge of the sleeve a margin, said margin being provided with a set of punch holes whereby the transparency-loaded protector can be kept when not in use in a ring binder, said rear panel being formed of polypropylene.

2. A protector as set forth in claim 1, wherein said flap is folded over a margin of the front panel and is free therefrom, so that the front panel can be unfolded.

3. A protector as set forth in claim 1, wherein one half section of the flap when it is folded over overlies the rear panel and is bonded thereto and the other half section of the flap overlies the margin of the front panel and is free so that the front panel can be unfolded.

4. A composite protector adapted to accommodate a transparency to maintain it in a clean, dust-free and dry condition so that it may be used with an overhead optical projector to cast the image carried by the transparency onto a viewing screen, the protector comprising an open-ended rectangular sleeve whose dimensions are appropriate to those of the transparency, the sleeve including a front panel formed of transparent, acetate film of relatively low strength that is breathable to permit a transparency inserted in the sleeve in a wet state to dry out, a rear panel formed of a transparent, polypropylene film of high strength having the same length as the front panel and joined thereto at one side edge to form a folder to receive the transparency so that it is then sandwiched between the panels, the width of the rear panel being greater than that of the front panel to form a high strength flap that is folded over to define a margin at the other side edge of the sleeve, one half section of the folded-over flap overlying the rear panel and being bonded thereto to form a strong margin section having holes punched therein, the other half section of the flap overlying an edge of the front panel and being free so that the front panel can be unfolded.

* * * * *